US012616101B2

(12) United States Patent
Jahay et al.

(10) Patent No.: US 12,616,101 B2
(45) Date of Patent: May 5, 2026

(54) AGRICULTURAL BALER

(71) Applicant: AGCO Corporation, Duluth, GA (US)

(72) Inventors: Tracy Alan Jahay, Hesston, KS (US);
Patrick L. Cherney, Hesston, KS (US)

(73) Assignee: AGCO Corporation, Duluth, GA (US)

( * ) Notice: Subject to any disclaimer, the term of this
patent is extended or adjusted under 35
U.S.C. 154(b) by 474 days.

(21) Appl. No.: 18/193,093

(22) Filed: Mar. 30, 2023

(65) Prior Publication Data

US 2023/0337586 A1     Oct. 26, 2023

Related U.S. Application Data

(60) Provisional application No. 63/363,584, filed on Apr.
26, 2022.

(51) Int. Cl.
*A01F 15/02*         (2006.01)
*A01F 15/08*         (2006.01)

(52) U.S. Cl.
CPC .......... *A01F 15/0875* (2013.01); *A01F 15/02*
(2013.01); *A01F 15/0841* (2013.01)

(58) Field of Classification Search
CPC .... A01F 15/0875; A01F 15/02; A01F 15/046;
B30B 9/3092
See application file for complete search history.

(56) References Cited

U.S. PATENT DOCUMENTS

2008/0095597 A1 *  4/2008  Heitz, Jr. ............. A01D 85/005
                                                  414/335
2020/0000041 A1    1/2020  Grady
2020/0214222 A1 *  7/2020  Olander ............... B30B 9/3003
2022/0248608 A1    8/2022  Grady

FOREIGN PATENT DOCUMENTS

GB          2106830 A  *  4/1983  ........... A01D 85/005

OTHER PUBLICATIONS

UK Intellectual Property Office, Search report for related UK
Application No. GB2216167.3, dated Apr. 3, 2023, 3 pages.

* cited by examiner

*Primary Examiner* — Cathleen R Hutchins

(57) ABSTRACT

In a high capacity baling apparatus concurrently formed first
formed bales and second formed bales are discharged from
respective bale forming regions to a discharge chute
arrangement. The disclosed discharge chute arrangement
comprises a first bale support surface, a second bale support
surface adjacent to the first bale support surface and dis-
posed at an angle to the first bale support surface, an impeller
located at a downstream end of the second bale support
surface and a displacement apparatus adapted to move
between a first position at one side of the first bale support
surface and a second position.

9 Claims, 3 Drawing Sheets

AGRICULTURAL BALER

FIELD OF THE INVENTION

The present invention relates to an agricultural baling apparatus, and in particular to a high capacity baling apparatus.

BACKGROUND

It is known to provide a baler with a plurality of baling chambers, extending generally in a fore-and-aft direction. The baling chambers are configured to allow small, square bales of crop material to be formed from harvested crop material taken from the ground. Where the baler includes a plurality of baling chambers and is capable of simultaneously forming multiple bales of crop material, the baler is known as a "high capacity" baler. The bales from the baling chambers are then ejected by means of an ejection chute to form a series of rows behind the baler. While such bales are more manageable than standard or large square bales, it can nevertheless still be cumbersome and time consuming to pick up and/or process such bales when deposited in multiple series or rows.

It is an advantage of the present invention that this problem is addressed.

SUMMARY OF THE INVENTION

According to a first aspect of the present invention, an agricultural baling apparatus comprises a first bale forming region, a second bale forming region and a discharge chute arrangement adapted to receive concurrently formed first formed bales and second formed bales discharged from the respective first and second bale forming regions and to discharge the first formed bales and second formed bales consecutively, in which the discharge chute arrangement comprises a first bale support surface, a second bale support surface adjacent to the first bale support surface and disposed at an angle to the first bale support surface, an impeller located at a downstream end of the second bale support surface and a displacement apparatus adapted to move between a first position at a first side of the first bale support surface and a second position.

Preferably, the impeller comprises a drive roller provided with a drive apparatus.

More preferably, the drive apparatus comprises a hydraulic motor.

Preferably the displacement apparatus comprises a moveable member adapted to be displaced between the first position at the first side of the first bale support surface remote from the second bale support surface and a second position away from the first side of the first bale support surface.

Preferably the displacement apparatus further comprises an actuator to control displacement of the moveable member. More preferably the actuator is a hydraulic actuator.

More preferably the moveable member is actuated to be displaced along its length away from the first side of the first bale support surface. Alternatively, the moveable member is actuated to displace a downstream end of the moveable member from the first side of the first bale support surface.

Preferably the agricultural baling apparatus further comprises an electronic control unit arranged to control the operation of the drive apparatus and the displacement apparatus. More preferably the agricultural baling apparatus further comprises a sensor configured to monitor the position of at least one of the first and second formed bales on either the first or second bale support surfaces.

According to a second aspect of the present invention, a method of operation of the agricultural baling apparatus of the first aspect of the invention comprises the steps of concurrently forming a first formed bale and a second formed bale, advancing the first formed bale from the first bale forming region to the second bale support surface and simultaneously advancing the second formed bale to the first bale support surface, and with the first formed bale on second bale support surface and the second formed bale on the first bale support surface, using the impeller to first remove the first formed bale from the second bale support surface, using the displacement apparatus to move the second formed bale from the first bale support surface to the second bale support surface and then using the impeller to remove the second formed bale from the second bale support surface.

According to a third aspect of the present invention a computer readable program comprises instructions which, when the program is executed by a computer, causes the agricultural baling apparatus of the first aspect of the invention to implement the method of the second aspect of the invention.

BRIEF DESCRIPTION OF THE DRAWINGS

The invention will now be described, by way of example only, with reference to the accompanying drawings, in which.

DETAILED DESCRIPTION OF SPECIFIC EMBODIMENTS OF THE INVENTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
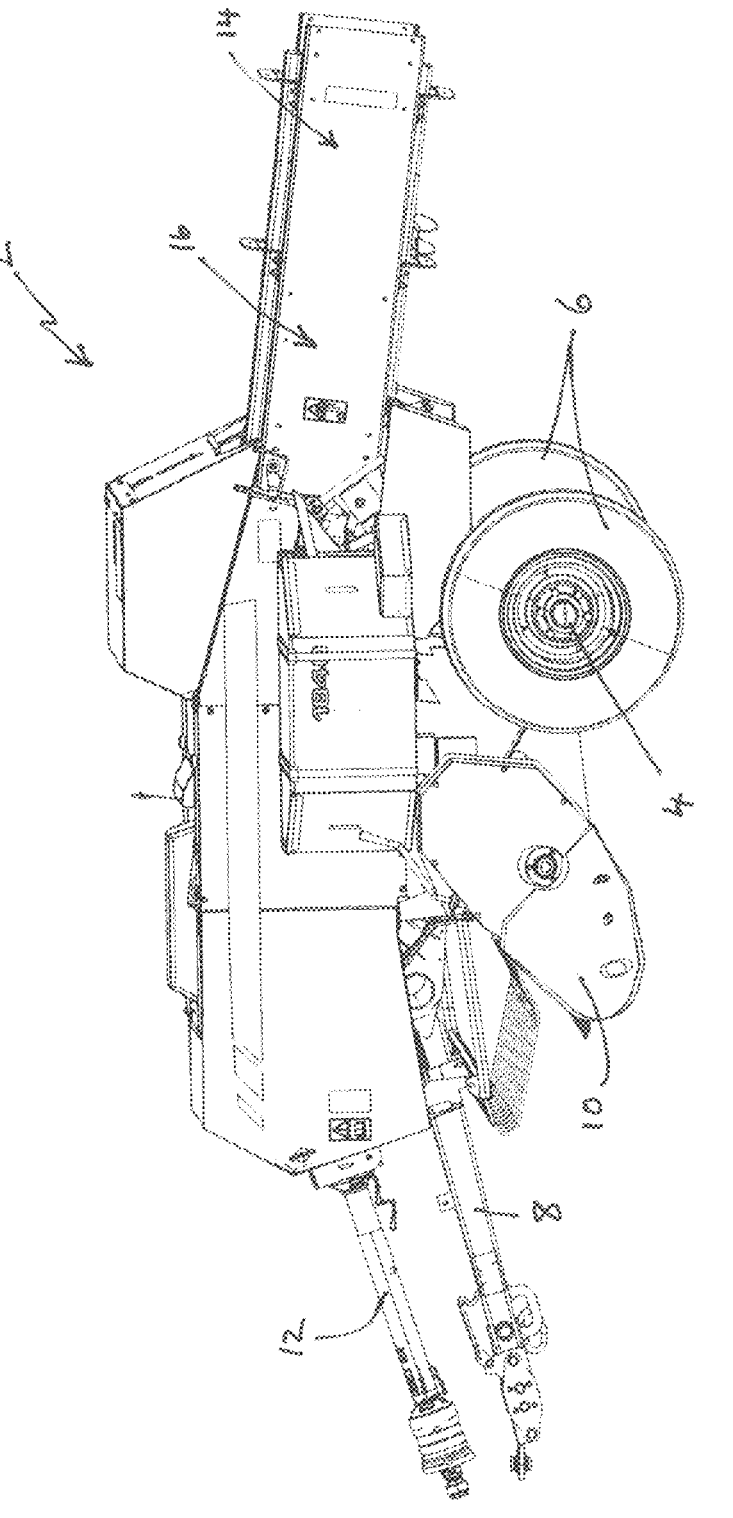
FIG. 1 shows a side view of a baler for use in the present invention.

With reference to FIG. 1, a baler 2 is shown. The baler 2 has a wheeled chassis or frame including an axle 4 and a pair of laterally spaced wheels 6 that support the chassis above the ground. The baler 2 is provided with a forwardly extending tongue 8 for connecting the baler 2 to a towing vehicle, such as a tractor.

The baler 2 additionally comprises a plurality of baling chambers 16, extending generally in a fore-and-aft direction and which are supported on the chassis. The baler 2 is provided with a pick up apparatus 10 by which harvested crop material arranged in a windrow on a ground surface may be lifted and directed towards the baling chambers. The harvested crop material is directed to a pick chamber 20 at a forward end of the baling chambers 16. The harvested crop material there forms a flake of harvested crop material. The baler 2 is further provided with a reciprocating plunger 22 (or a reciprocating plunger associated with each baling chamber) that compresses the flake of harvested crop and pushes it rearwards into the baling chambers 16 to generate forming bales within the baling chambers 16. The plunger 22 is provided with drive means 12 adapted to be connected to a Power Take Off (PTO) of the towing vehicle.

The baler 2 additionally comprises a plurality of knotter units for tying one or more strands of binding material (such as twine, wire, cord or the like) around the bales of crop material being formed in the baling chambers.

Once the forming bales have been formed, they are directed to a discharge or ejection chute arrangement 14.

Figure 2:
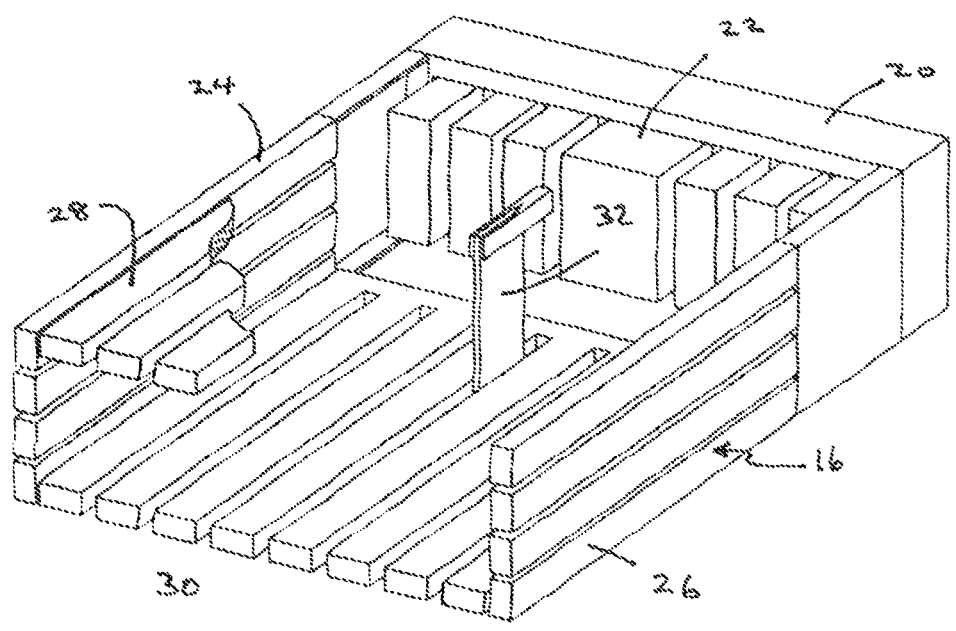
FIG. 2 shows a part sectional perspective view of a baling chamber that may be used in the present invention.

An upper end of the pick-up chamber 20 in FIG. 2 can be seen adjacent a baling chamber 16. The plunger 22 extends thorough the pick-up chamber 20 to urge a flake of crop material into the baling chamber 16. The baling chamber 16 comprises first and second side walls 24,26 and upper and lower walls 28,30. A splitting blade 32 is mounted centrally within the baling chamber and extends between the upper and lower walls 28,30. In a preferred embodiment the plunger 22 does not contact the splitting blade 32. Preferably the front edge of the splitting blade 32 is tapered to a cutting edge, such that the splitting blade 32 aids splitting of the compressed crop material into parallel forming bales within the baling chamber 16. Optionally, the opposing walls 24 and 26, 28 and 30 of the baling chamber 16 may be displaceable with respect to one another in order to control the density of each formed bale.

Figure 3:
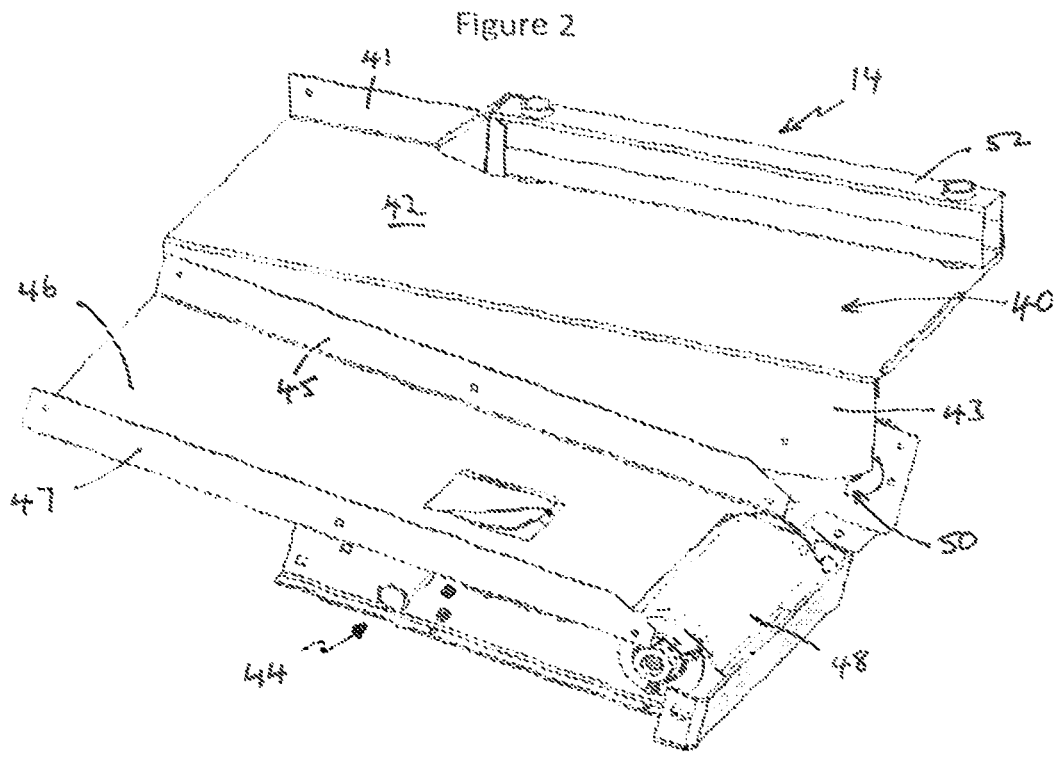
FIG. 3 shows a perspective view of an ejection chute arrangement for use in the present invention.
Figure 4:
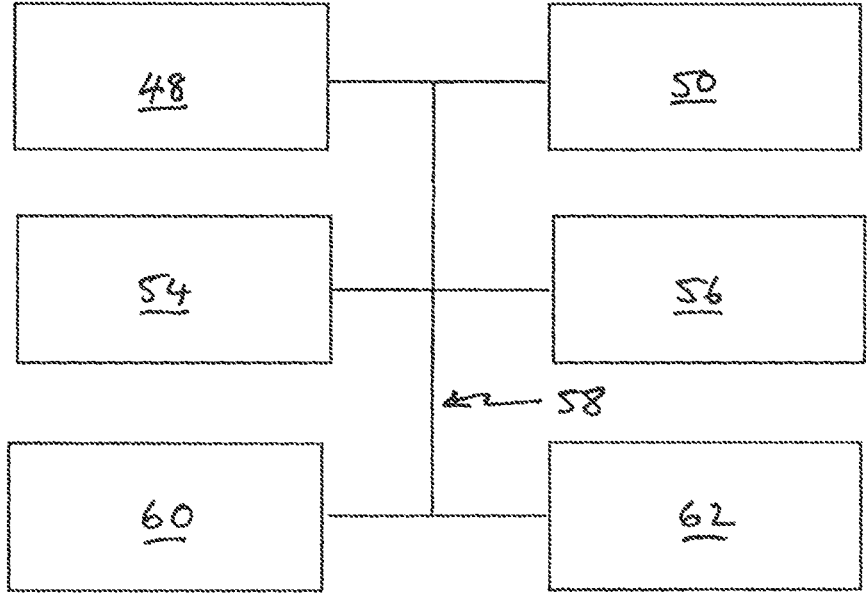
FIG. 4 shows a schematic view of certain elements of the present invention.

The ejection chute arrangement 14 is shown in more detail in FIG. 3. The arrangement includes a first frame element 40 providing a first bale support surface 42 and a second frame element 44 providing a second bale support surface 46, a driven roller 48 and a drive motor 50 for the driven roller 48. Preferably, the drive motor 50 is a hydraulic motor.

The first frame element 40 also includes a moveable member 52 adapted for displacement across the first bale support surface 42. The first bale support surface 42 is substantially horizontal in a fore and aft direction.

The second bale support surface 46 is arranged alongside the first bale support surface 42 and is angled downward with respect to the first bale support surface 42. The driven roller 48 and the drive motor 50 for the driven roller 48 are arranged downstream at the lower end of the second bale support surface 46.

The moveable member 52 is located at a first side of the first bale support surface 42, the first side of the first bale support surface being remote from the second bale support surface. The first side of the first bale support surface 42 is conveniently provided with an upwardly directed guide flange 41 along at least a part of its length. A second side of the first bale support surface 42, adjacent the second bale support surface 46, is provided with a downwardly directed flange 43.

The second bale support surface 46 is supported from the second frame element 44. A first upwardly extending guide flange 45 extends along a first side of the second bale support surface 46. A second upwardly extending guide flange 46 extends along a first side of the second bale support surface 46. The first upwardly extending guide flange 45 is arranged adjacent to the downwardly directed flange 43.

As the first and second formed bales are driven from the baling chamber(s) 16 onto the discharge chute arrangement 14, the first formed bale is urged onto the second bale support surface 46 between the first upwardly extending guide flange 45 and the second upwardly extending guide flange 47, while the second formed bale is urged onto the first bale support surface 42 alongside the moveable member 52.

As a leading edge of the first formed bale reaches the lower end of the second bale support surface 46, the leading edge of the first formed bale will contact the roller 48. As the roller 48 is driven, the first formed bale is accelerated to the rear of the baler 2 to a takeaway region of the discharge chute arrangement 14 in line with the second bale support surface 46. The roller 48 directs the formed bale to the ground. If baling downhill bale supports of the baler 2 will be pointed upwardly or horizontally and, absent the roller 48, the formed bale would not slide off the discharge chute arrangement. The speed of the roller 48 can be accelerated to a slightly higher speed than the baling speed (that is the speed at which the formed bales are being formed and advanced from the baling chamber) to keep the bales from standing vertically on end.

The second formed bale is advanced at the same rate as the first formed bale such that when the first formed bale contacts the driven roller 48, the second formed bale is fully on the first bale support surface 42 and located alongside the moveable member 52. The moveable member 52 is configured to move between a first position at the first side of the first bale support surface 42 and a second position in which the second formed bale is urged off the first bale support surface 42 and onto the second bale support surface 46.

Once the first formed bale has been removed from the second bale support surface 46, the moveable member 52 is operated by a suitable actuator 54 to move to the second position so as to displace the second formed bale onto the second bale support surface 46 and is then returned to the first position. Conveniently, the actuator 54 comprises a hydraulic actuator. The moveable member 52 can take any suitable for. In the illustrated embodiment, the moveable member 52 takes the form of an elongate bar.

The driven roller 48 will then accelerate the second formed bale into the takeaway region of the discharge chute arrangement 14 behind the first formed bale. Depending upon the length of the takeaway region, movement of the second formed bale into the takeaway region may cause the first formed bale to exit the takeaway region and to be deposited on the ground. Consecutively deposited formed bales will thus be arranged in a single file fashion where they may more easily be collected by conventional equipment, than when deposited in multiple closely adjacent series or rows.

The roller drive 50 and the actuator 54 for the moveable member are conveniently connected to an electronic control unit 56 by a network 58. The drive roller 48 can be driven throughout the baling operation or controlled by the control unit 56 so as only to operate when a leading edge of a formed bale is expected to engage with the roller 48. For example, the roller 48 may be selectively driven only once the moveable member 52 has been returned to the first position.

A sensor 60 may be provided on the second support surface to determine when the first formed bale is adjacent a downstream end of the second support surface. Since the first and second formed bales exit the baling chambers 8 at the same rate, if the second formed bale is in this position the first formed bale will also be in position on the second support surface to be moved if the roller drive 50 is actuated.

Alternatively, the sensor may be omitted and since the formed bales are formed at a steady rate, the control unit 56 may be provided with a timing schema to operate in accordance with the predetermined length of the formed bales and the known rate of travel of the formed bales.

Alternatively, the sensor 60 may be provided on the first support surface instead of the second support surface or an additional sensor may be provided on the first support surface (as well as on the second support surface).

An operator may be informed of the operation of the discharge chute arrangement 14 by way of a Human Machine Interface 62 in communication with the control unit 56.

It will be understood that other methods of forming parallel bales side by side and being expelled at the same rate may be used.

From reading the present disclosure, other modifications will be apparent to persons skilled in the art. Such modifications may involve other features which are already known in the field of balers and component parts therefore and which may be used instead of or in addition to features already described herein.

The invention claimed is:

1. An agricultural baling apparatus comprising a first baling chamber, a second baling chamber and a discharge chute arrangement adapted to receive concurrently formed first formed bales and second formed bales discharged from the respective first and second baling chambers and to discharge the first formed bales and second formed bales consecutively, in which the discharge chute arrangement comprises a first bale support surface, a second bale support surface adjacent to the first bale support surface and disposed at a downward angle with respect to the first bale support surface, a drive roller provided with a drive apparatus located at a downstream end of the second bale support surface and a displacement apparatus comprising a moveable member adapted to be displaced across the first bale support surface between a first position at a first side of the first bale support surface furthest from the second bale support surface and a second position away from the first side of the first bale support surface and adjacent the second bale support surface.

2. The agricultural baling apparatus according to claim 1, in which the drive apparatus comprises a hydraulic motor.

3. The agricultural baling apparatus according to claim 1, in which the displacement apparatus further comprises an actuator to control displacement of the moveable member.

4. The agricultural baling apparatus according to claim 3, in which the actuator is a hydraulic actuator.

5. The agricultural baling apparatus according to claim 1, in which the moveable member is actuated to be displaced along a length of the movable member away from the first side of the first bale support surface.

6. The agricultural baling apparatus according to claim 1, in which the moveable member is actuated to displace a downstream end of the moveable member from the first side of the first bale support surface.

7. The agricultural baling apparatus according to claim 1, in which the agricultural baling apparatus further comprises an electronic control unit arranged to control the operation of the drive apparatus and the displacement apparatus.

8. The agricultural baling apparatus according to claim 7, in which the agricultural baling apparatus further comprises a sensor configured to monitor the position of at least one of the first and second formed bales on either the first or second bale support surfaces.

9. A method of operation of an agricultural baling apparatus having a first baling chamber, a second baling chamber and a discharge chute arrangement adapted to receive concurrently formed first formed bales and second formed bales discharged from the respective first and second baling chambers and to discharge the first formed bales and second formed bales consecutively, in which the discharge chute arrangement comprises a first bale support surface, a second bale support surface adjacent to the first bale support surface and disposed at an angle to the first bale support surface, a drive roller provided with a drive apparatus located at a downstream end of the second bale support surface and a displacement apparatus adapted to move between a first position at a first side of the first bale support surface and a second position, the method comprising:

concurrently forming a first formed bale and a second formed bale;

advancing the first formed bale from the first bale forming region to the second bale support surface and simultaneously advancing the second formed bale to the first bale support surface;

and with the first formed bale on second bale support surface and the second formed bale on the first bale support surface;

using the drive roller to first remove the first formed bale from the second bale support surface;

using the displacement apparatus to move the second formed bale from the first bale support surface to the second bale support surface; and then using the drive roller to remove the second formed bale from the second bale support surface.

* * * * *